United States Patent [19]

Cane et al.

[11] 4,371,101
[45] Feb. 1, 1983

[54] FILTERING SCREEN FOR USE IN APPARATUS FOR THE DOSING OF POWDERED MATERIAL

[75] Inventors: Alessandro Cane; Arrigo Farneti, both of Bologna, Italy

[73] Assignee: Zanasi Nigris S.p.A., Bologna, Italy

[21] Appl. No.: 202,659

[22] Filed: Oct. 31, 1980

[30] Foreign Application Priority Data

Oct. 31, 1979 [IT] Italy .................. 12799 A/79

[51] Int. Cl.³ .......................................... G01F 11/10
[52] U.S. Cl. ................................. 222/636; 222/189;
  222/199; 222/335; 406/63
[58] Field of Search ............... 222/189, 394, 335, 403,
  222/565, 196.1, 196.2, 196, 199, 636; 141/286;
  73/863.23, 863.25, 864.33; 264/271, 109, 126;
  406/63

[56] References Cited

U.S. PATENT DOCUMENTS

| 3,285,296 | 11/1966 | Ishimaru et al. | 222/189 |
| 3,362,640 | 1/1968 | Fainman | 222/189 |
| 3,430,497 | 5/1969 | Tenczar | 73/863.25 |
| 3,645,583 | 2/1972 | Heath | 222/199 |
| 3,748,905 | 7/1973 | Fletcher et al. | 73/863.25 |
| 4,035,303 | 7/1977 | Ufferfilge | 222/189 |

FOREIGN PATENT DOCUMENTS 484267 6/1952 Canada .................. 222/335

Primary Examiner—H. Grant Skaggs
Attorney, Agent, or Firm—Lowe, King, Price and Becker

[57] ABSTRACT

An apparatus for the dosing of finely powdered material employs a volumetric chamber adapted to receive an amount predetermined by volume of the powdered material, and presenting a filtering screen through which pneumatic suction is applied for the taking up and compacting of the powdered material, and pneumatic pressure is applied for the discharge of the said powdered material.

The said filtering screen is made of a fabric of mono-filament synthetic material, and preferably of mono-filaments of a polytetrafluoroethylene resin, said mono-filaments constituting both the warp and the weft of the fabric.

4 Claims, 4 Drawing Figures

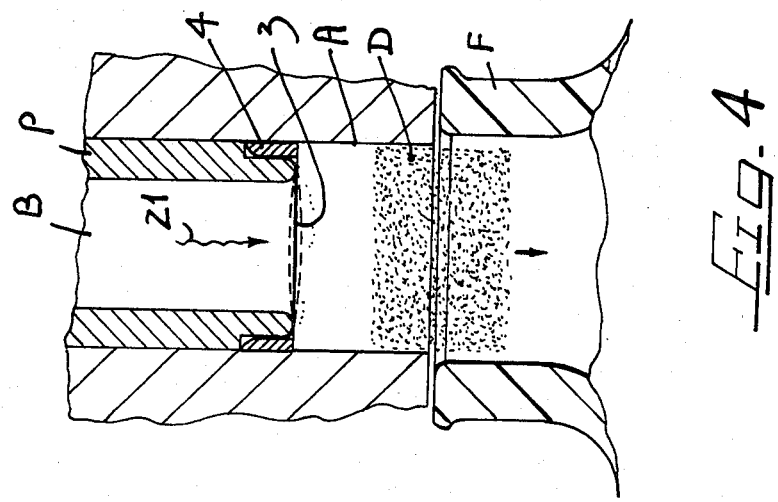
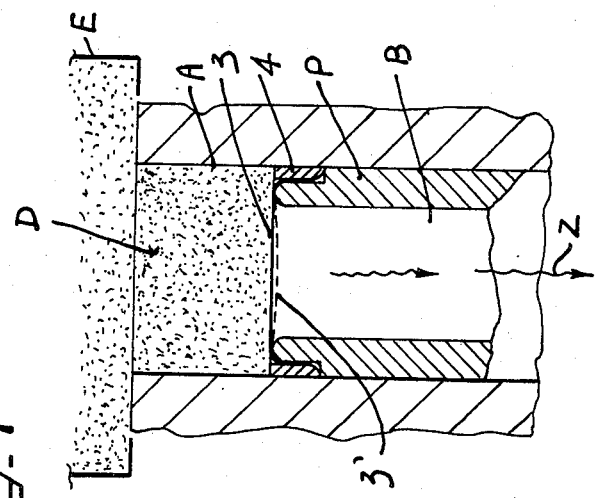
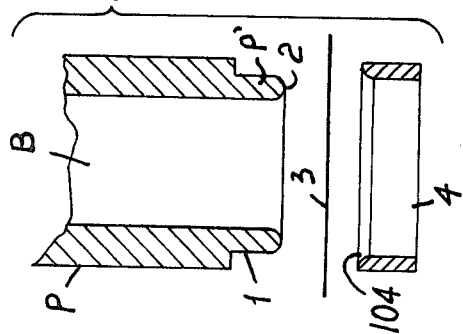
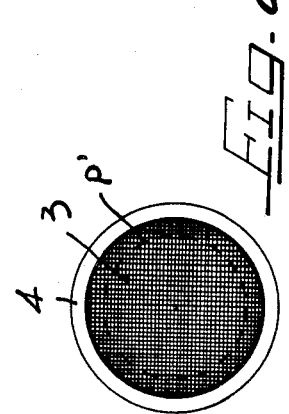

FILTERING SCREEN FOR USE IN APPARATUS FOR THE DOSING OF POWDERED MATERIAL

BACKGROUND AND SUMMARY OF THE INVENTION

Suction-operating volumetric dosers are know, in which each dosing chamber is defined by a filtering member or screen through which said chamber is firstly, subjected to vacuum to cause the powder material to enter the chamber and fill it completely with a desired degree of compaction, and secondly, subjected to pressure to eject the dosed material. Heretofore, said screens have been made either of small discs of sintered stainless steel, 2-3 mm. thick and having interstices ranging in amplitude from 14 to 160 microns, or of small discs of felt approximately 4 mm. thick and having interstices ranging within a few microns. If these screens are used for dosing finely powdered materials, such as the powder pharmaceuticals, such as antibiotics, said screens will become clogged quickly, with obvious consequences.

The reasons that make said small discs of sintered stainless steel or felt unsuitable to constitute filtering screens for fine powder material, are of various kinds and can be summarized as follows:

randomly-scattered sizes and spacing of the interstices or pores through which the air stream passes;

tortuosity of said interstices, which results in considerable loss of head, so as to require relatively high levels of suction and compression, which on turn requires discs of relatively high thickness to withstand the mechanical stresses resulting from either the suction and compression reciprocating air streams to which they are subjected.

To solve this problem, therefore, a filtering screen should present perfectly calibrated uniform and evenly-distributed interstices, said interstices being, moreover, of limited length. Several efforts have been made for this purpose, by providing wire mesh screens made with thin wires of stainless steel and complying with said requirements, but said screens had a poor resistance to the mechanical stresses to which they were submitted by the suction and compression air streams mentioned above. Efforts were made, therefore, to develop diaphragms of mesh formation having a higher resistance to mechanical stresses, and according to the invention it was found that the problem is solved satisfactorily by means of a fabric of synthetic material, of mono-filament structure, that is wherein the warp and the weft are constituted by mono-filaments and not by a spun yarn, and which is, at the same time, of sterilizable and non-toxic nature. Such a fabric can be made of a material such as the polytetrafluoroethylene resin commercially known under the registered trade mark "Teflon" or the like. The interstices of the fabric, obviously, shall have a width which is conveniently smaller than the fineness of the powder material to be handled.

Secondarily, the invention solves the problems of the correct positioning of the said fabric screen in its operative place, and of a quick and easy substitution of said fabric screen, whenever required.

The above and other advantages of the filtering member or screen according to the invention, will appear evident from the following description of a preferred embodiment of same.

BRIEF DESCRIPTION OF THE DRAWINGS

FIG. 1 is an exploded view showing in section the components of a plunger of one of the dosing chambers of a rotary doser, incorporating the new filtering screen.

FIG. 2 is a plan view from the bottom of the assembled plunger of FIG. 1, with the screen mounted thereon.

FIGS. 3 and 4 shown the dosing chamber of a rotary doser, incorporating the novel screen according to the invention, respectively during the suction step and the ejection step.

DESCRIPTION OF THE PREFERRED EMBODIMENT

In the figures, the invention is illustrated by making reference to a dosing device for fine powders, such as pharmaceuticals, and for example a rotary doser wherein each dosing chamber A is defined by a hollow plunger P onto which there is mounted the filtering screen, the axial movement of said plunger P permitting to vary the volume of said chamber as desired. Through the axial bore B said plunger P, the chamber A is first subjected to suction (FIG. 3) and then to compression (FIG. 4).

With reference to FIG. 1, it will be noted that the end portion of the plunger P presents an outer, annular, concentric recess 1 so as to be of reduced diameter as shown at P'. The edge of this end portion P' of the plunger is suitably rounded as shown at 2. The screen 3 is made of a mono-filament fabric of a suitable polytetrafluoroethylene resin, such as for example the one commercially known under the trade mark "Teflon". The piece of fabric making the screen 3, presents a width which is suitably larger than the outer dimension of P', and is positioned on the end portion of P'. A ring member 4 having an outer diameter not larger than the plunger and an inner diameter snugly fitting on P' is mounted on the latter end portion so as to holdingly embrace the interposed margin of the diaphragm 3. Upon fitting said ring member 4, which has a suitably rounded front edge 104 to avoid any cutting action on the screen 3, the latter is thus firmly held in place in a suitable taut condition (FIG. 2). To replace the filtering screen formed by said diaphragm 3, the ring member 4 is simply removed, and it is apparent that both this operation and the operation to set the screen 3 in place can be effected easily, even by unskilled persons.

FIG. 3 shows the dosing chamber during the active step for sucking the powder material D from a suitable tank E. During this step, due to the suction force Z, the screen 3 is slightly deflected away from the chamber, as shown by dotted line at 3'. This deflection, however, is constant at all times, and once its effect on the dosed amount has been calculated, the successive amounts will be always dosed precisely and constantly.

Inasmuch as the screen is made of a fabric having a limited thickness, during the successive step for discharging the powder material D from the chamber A into a container F (FIG. 4), and also successively when said chamber is cleaned by a suitable compressed air jet Z1, said screen 3 is subjected to a slight vibration so as to remove any residual material therefrom.

The advantages resulting from the use of the novel filtering screen cam be summarized as follows:

(a) Any finely powdered material can be dosed with no risk of clogging the screen and dosing chamber, and therefore without affecting the precision of the doser.

(b) The construction is of low cost.

(c) The operator can easily replace the filtering screen, with resulting reduction of cost for maintenance and replacements.

(d) By virtue of the reduced thickness of the material forming the filtering screen, and therefore by virtue of the linearity and small length of the interstices of the screen, the values of both suction and compression pressures in the steps of FIGS. 3 and 4 and in the cleaning step, respectively, can be reduced, with resulting constructional advantages and longer life of the components.

It is to be understood that the above description relates to a preferred embodiment and use of the novel filtering screen, which can be employed also in combination with devices other than that illustrated in the accompanying drawings, and for any other use, whenever there is needed a filtering screen having the characteristics of the present screen. Moreover, depending on the different uses of the screen, it is to be understood that several changes and modifications can be made thereto, particularly in the construction thereof, without departing from the basic priciple of the invention, as above described, as shown in the accompanying drawings and as claimed hereinafter.

We claim:

1. In an apparatus for dosing and dispensing finely powdered material employing an open-ended volumetric chamber adapted to receive a predetermined volume of powdered material, said chamber including a bottom wall located opposite to the open end being defined by a filtering screen, suction being applied through the screen to draw and compact powdered material into the chamber, and pressure being applied through the screen to discharge powdered material from the chamber, the improvement comprising said filtering screen being formed of a fabric of mono-filament synthetic material arranged as both the warp and weft of the fabric, and including securing means for clamping and tensioning the screen in relation to the chamber so that the screen is drawn taut over a portion of the securing means to define said bottom wall and vibrates to produce substantially constant deflection when acted upon by a pressurized jet of air.

2. In an apparatus according to claim 1, wherein said screen is fitted over an end of a cylindrical plunger arranged at the interior of the said volumetric chamber, said plunger end having an outer annular recessed portion receiving a securing ring in snug fitting relationship said securing ring clamping and tensioning the screen to cover the plunger end.

3. In an apparatus according to claim 1 or 2, wherein the diameter of the mono-filaments constituting the screen fabric are dimensioned to allow a vibratory movement of the screen when said screen is acted upon by a pressurized jet of air so as to render the interstices of the screen free from any trace of powdered material.

4. In an apparatus according to claim 3, wherein said screen is formed from a polytetrafluoroethylene resin.

* * * * *